United States Patent
Bi et al.

(10) Patent No.: US 11,795,242 B1
(45) Date of Patent: Oct. 24, 2023

(54) METHOD FOR ADJUSTING POROUS STRUCTURE AND TEXTURE OF FREEZE-DRIED PECTIN AEROGEL

(71) Applicant: INSTITUTE OF FOOD SCIENCE AND TECHNOLOGY, CHINESE ACADEMY OF AGRICULTURAL SCIENCES, Beijing (CN)

(72) Inventors: Jinfeng Bi, Beijing (CN); Jianyong Yi, Beijing (CN); Shuhan Feng, Beijing (CN); Xin Jin, Beijing (CN); Xinye Wu, Beijing (CN); Youchuan Ma, Beijing (CN)

(73) Assignee: INSTITUTE OF FOOD SCIENCE AND TECHNOLOGY CHINESE ACADEMY OF AGRICULTURAL SCIENCES, Beijing (CN)

( * ) Notice: Subject to any disclaimer, the term of this patent is extended or adjusted under 35 U.S.C. 154(b) by 0 days.

(21) Appl. No.: 18/336,627

(22) Filed: Jun. 16, 2023

(30) Foreign Application Priority Data

Jul. 12, 2022 (CN) .......................... 202210816339.3

(51) Int. Cl.
*C08B 37/00* (2006.01)
(52) U.S. Cl.
CPC ................................ *C08B 37/0045* (2013.01)

(58) Field of Classification Search
CPC .................................................. C08B 37/0045
USPC .......... 435/275; 536/1.11, 2, 4.1, 45; 514/60
See application file for complete search history.

(56) References Cited

U.S. PATENT DOCUMENTS 5,502,082 A * 3/1996 Unger ...................... B01J 20/24
536/52

* cited by examiner

*Primary Examiner* — Ganapathy Krishnan
(74) *Attorney, Agent, or Firm* — Platinum Intellectual Property

(57) ABSTRACT

Disclosed is a method for regulating a porous structure and texture property of a freeze-dried pectin aerogel, which comprises the following steps of step 1: preparation of pectin/starch solution by mixing pectin powder and a gelatinized starch solution to form a stable pectin/starch mixed solution, a concentration of the pectin being 0.05% to 0.2% (w/v); step 2: induction of gel reaction by adding D-(+)-Glucono-δ-lactone and calcium carbonate into the stable pectin-starch mixed solution; and step 3: vacuum freeze of the starch/pectin composite gel subjected to the gel reaction to obtain the freeze-dried pectin/starch aerogel with an adjustable porous structure and an improved texture characteristic. Controllable regulation of the porous structure of the freeze-dried pectin aerogel is achieved by the method without complex pretreatment. Raw material ingredients applied in the method are cheap, easy-to-access, and has low-toxicity.

9 Claims, 2 Drawing Sheets

METHOD FOR ADJUSTING POROUS STRUCTURE AND TEXTURE OF FREEZE-DRIED PECTIN AEROGEL

TECHNICAL FIELD

The present invention belongs to the field of nitrite detection technologies, and relates to a method for regulating a porous structure and texture property of a freeze-dried pectin aerogel.

BACKGROUND

Food-grade aerogels have attracted more and more attentions in food industry due to their ultra-low density, highly porous structure, as well as highly specific surface area. Indeed, food-grade aerogels derived from polysaccharides, proteins, and seed mucilages with official recognized as safe (GRAS) status are successfully being manufactured in recent decade, wherein the polysaccharide aerogel is one of the most important types of food-grade aerogel due to their biocompatibility, bioactivity, biodegradability, low toxicity, and renewability. Although a variety of polysaccharides such as alginate, pectin, κ-carrageenan, and konjac glucomannan have been widely used to prepare the food-grade aerogels, as the main polysaccharide composition of the cell wall of the plant, the structure, chemical modification, molecular cross-linking, and application of pectin gradually being valued. The pectin is a complex polysaccharide located in the primary cell wall of plants, and is generally categorized into three domains including: homogalacturonan (HG), rhamnogalacturonan (RG-I) and rhamnogalacturonan II (RG-II). HG is a smooth region that consists only of α-1,4-linked galacturonic acid (GalA) with partially methyl- or acetyl-esterified carboxyl groups on O-6 carboxyl generally, and constitutes a "smooth region" in the pectin structure. RG I and RG-II are highly branched regions with complex neutral side chains consisting of different types of sugars. According to the degree of methoxylation (DM), pectin can be classified as low methoxyl pectin (LMP, DM <50%) and high methoxyl pectin (HMP, DM >50%). When there are divalent ions, the low methoxyl pectin may be gelatinized according to the classic egg-box model. HMP is able to form gels at acid pH (<3.5) and in presence of co-solutes such as alcohols or mono and disaccharides.

Generally, there are different methods for manufacturing a porous material of the aerogel, one of which is to dry a polymer hydrogel system to remove a solvent. In order to maintain a high porosity and avoid pore collapse, vacuum freeze drying (FD) and supercritical drying are considered to be commonly used advanced drying methods for preparing the porous material. Compared with the supercritical drying, the freeze drying technology has the advantages of environmental friendliness, high safety and easy to operate, and is one of drying methods for achieving large-scale commercial production of the food-grade aerogels in the future. Freezing is a necessary procedure during freeze drying, and there is a cryoconcentration effect during ice growth, which pushes and gathers a polysaccharide network into a gap surrounded by growing ice crystals, and a pore wall of a frozen gel is formed after t sublimation. Therefore, a pore morphology of the aerogel is mainly determined by ice crystal growth behaviors. Compared with other porous materials, the freeze-dried pectin aerogel usually exhibited a larger macroporous structure (micron size), a thicker flaky wall and a lower specific surface area, which means that the pectin freeze-dried aerogel serving as a carrier has a very short release time. In addition, due to an obvious negative correlation between a macropore and a compressive strength, a mechanical strength of the pectin freeze-dried gel will be weaker than those of other porous materials, which means that the pectin freeze-dried aerogel serving as a food-grade biological carrier has limitations. Therefore, it is necessary to achieve controllable adjustment of a porous structure of the pectin freeze-dried aerogel.

A large number of studies have shown that a method for controlling the porous structure of the freeze-dried aerogel comprises three ways of: adjusting a concentration of a polymer for preparing the aerogel, adjusting a freezing rate of the freeze-dried aerogel, and adding other polymers to change ice crystal growth. Influences of the concentration of the polymer and the freezing rate on the porous structure of the frozen aerogel have been studied extensively. However, in view of the diversity of polysaccharide type and structure, an influence of other polysaccharides on the porous structure and texture properties of the pectin freeze-dried aerogel is still an open question. However, this also implies that more possibilities are present to regulate the porous structure and texture properties of the pectin freeze-dried aerogel with other polysaccharides.

SUMMARY

One object of the present invention is to solve at least the above problems and/or defects, and to provide at least the advantages to be described hereinafter.

Starch serving as another abundant, biodegradable and non-toxic polysaccharide resource has been proved to be applicable in aerogel preparation. Natural starch exists in plants in a granular form, and usually consists of two ingredients of α-glucan polymer, so-called amylose and amylopectin. When starch granules are heated in water, the granules may absorb water, swell and collapse, and eventually lose recognizable shape thereof, also defined as 'gelatinization'. With the increase of a degree of gelatinization, physical, chemical and structural properties of the starch granules are changed significantly and irreversibly, resulting in high-apparent viscosity and water binding ability. Thus, the above continuous evolution in the physicochemical properties of starch during gelatinization inspires us with the high possibility to controllably regulate the pore morphology for pectin aerogels.

At present, there are few studies focus on the influence of the degree of gelatinization of starch on a porous structure and a texture property of a pectin freeze-dried aerogel, there is still a phenomenon that the related pectin freeze-dried aerogel has an excessively large pore diameter and a low mechanical strength, and in addition, there is no related study showing that gelatinized starch can achieve effective adjustment of a microstructural and textural characteristics of the pectin freeze-dried aerogel as a potential carrier.

Therefore, another object of the present invention is to provide a method for regulating a porous structure and a texture property of a freeze-dried pectin aerogel, and a technical solution provided by the present invention is as follows.

A method for regulating a porous structure and texture property of a freeze-dried pectin aerogel includes the following steps of:

step 1: preparation of pectin/starch solution by mixing pectin powder and a gelatinized starch solution to form a stable pectin/starch mixed solution, wherein a concentration of the pectin is 0.05% to 0.2% (w/v);

step 2: induction of gel reaction by adding D-(+)-Glucono-δ-lactone and calcium carbonate into the pectin-starch mixed solution; and step 3: vacuum freeze-drying of the starch/pectin composite gel to obtain the freeze-dried pectin/starch aerogel with an adjustable porous structure and an improved texture characteristic.

Preferably, according to the method for regulating the porous structure and the texture property of the freeze-dried pectin aerogel, in the step 2, in the stable pectin/starch mixed solution, the D-(+)-gluconic acid δ-lactone has a concentration of 30 mM, and the calcium carbonate has a concentration of 25 mM. $Ca^{2+}$ is an important factor causing cross-linking of low methoxyl pectin and forming a gel network. A pH value of the solution is gradually reduced by using (+)-gluconic acid δ-lactone to release the $Ca^{2+}$ slowly and achieve the slow gelling of the low methoxyl pectin, thus obtaining a gel system with a uniform structure.

Preferably, according to the method for regulating the porous structure and the texture property of the freeze-dried pectin aerogel, in the step 2, the gel reaction is carried out at a temperature of 25° C. and is maintained for 12 hours.

Preferably, according to the method for regulating the porous structure and the texture property of the freeze-dried pectin aerogel, in the step 3, the specific method of the vacuum freeze drying comprises: under a vacuum pressure of 80 Pa, setting temperatures of a heating plate and a cooling trap to be −20° C. and −40° C. respectively, and carrying out the vacuum freeze drying for 3 days.

Preferably, according to the method for regulating the porous structure and the texture property of the freeze-dried pectin aerogel, in the step 3, before carrying out the vacuum freeze drying, the starch-pectin composite gel is also frozen at −60° C. for 12 hours to form a starch-pectin composite gel. Pre-freezing is carried out at a low temperature to obtain the frozen starch-pectin composite gel system; and the gel system is frozen under a metal mold, and a freezing plate should not be directly contacted to achieve uniform ice crystal growth.

Preferably, according to the method for regulating the porous structure and the texture property of the freeze-dried pectin aerogel, in the step 1, starch is added into water at a solid-liquid ratio of 1:10, and gelatinized at a constant temperature of 60° C. for 0 minute to 30 minutes.

Preferably, according to the method for regulating the porous structure and the texture property of the freeze-dried pectin aerogel, in the step 1, the pectin is low-fat pectin.

Preferably, according to the method for regulating the porous structure and the texture property of the freeze-dried pectin aerogel, the starch is potato starch. The starch may also be corn starch, sugarcane starch and the like.

Preferably, according to the method for regulating the porous structure and the texture property of the freeze-dried pectin aerogel, in the step 1, the pectin and the gelatinized starch solution are fully stirred by a rotary mixer for 12 hours to obtain the fully hydrated pectin-starch stable mixed sol solution.

The present invention at least comprises the following beneficial effects:

The freeze-dried pectin/starch aerogels in present invention is formed by mixing the pectin and the starch, which leads to smaller pore diameter greater pore wall thickness, larger specific surface area, and higher mechanical strength of the freeze-dried pectin aerogels. By controlling the degree of gelatinization of the starch, the controllable regulation of the pore morphology of the aerogel is achieved, and the mechanical strength of the pectin aerogel is optimized at the same time.

The regulation of the porous structure of the freeze-dried pectin aerogel is achieved through the present invention without complex pretreatment.

Raw material ingredients applied in the product method according to the method are cheap low in price, easy-to-access, n and has low-toxicity. Other advantages, objects and features of the present invention will be partially reflected by the following description, and will be partially understood by those skilled in the art through researching and practicing the present invention.

DETAILED DESCRIPTION

Figure 1:
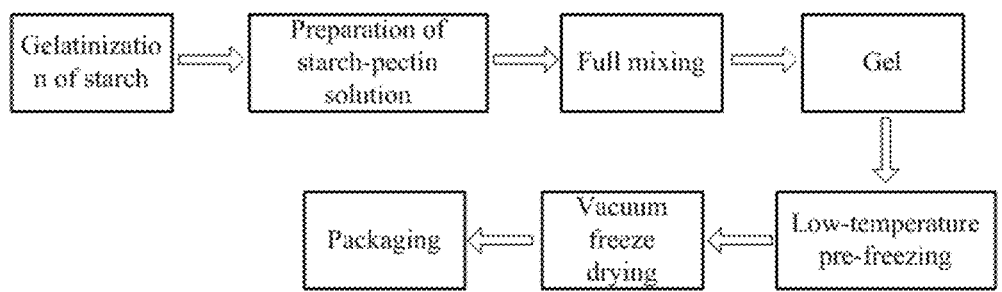
FIG. 1 is a flow chart of a method for regulating a porous structure and a texture property of a freeze-dried pectin aerogel in some technical solutions of the present invention.

The present invention is further described in detail hereinafter, so that those skilled in the art can implement the present invention with reference to the specification.

It should be understood that the terms such as "have", "contain" and "comprise" used herein do not indicate the existence or addition of one or more other elements or combinations thereof It should be noted that experimental methods described in the following embodiments are all conventional methods unless otherwise specified. All the reagents and materials can be obtained commercially unless otherwise specified.

In order to make those skilled in the art better understand the technical solutions of the present application, the following embodiments are now provided for description.

A method for regulating a porous structure and a texture property of a freeze-dried pectin aerogel included the following steps.

In step 1, starch was gelatinized: potato starch was gelatinized under water bath at a constant temperature of 60° C. for 0 min, 2 min, 8 min and 30 min. The starch might also be corn starch, sugarcane starch and other similar starch. When the starch was gelatinized, a solid-liquid ratio of the potato starch to water was 1:10.

In step 2, a starch/pectin solution was prepared: a series of gelatinized starch solutions were mixed with low methoxyl pectin, wherein a concentration of the low methoxyl pectin was generally 0.05% to 2.0% (w/v).

In step 3, full mixing was carried out: the pectin and the gelatinized starch solution are fully stirred by a rotary mixer for 12 hours to avoid agglomeration, and a dissolved pectin/starch mixed solution was finally obtained.

In step 4, D-(+)-gluconic acid δ-lactone and calcium carbonate were added into the stable pectin/starch mixed solution for galation for 12 hours. $Ca^{2+}$ was an important factor causing the cross-linking of LMP and forming a gel network. A pH value of the solution was gradually reduced by using D-(+)-gluconic acid δ-lactone to release the $Ca^{2+}$ slowly and achieving the slow gelling of the low methoxyl pectin, thus obtaining a gel system with a uniform structure. A content of the D-(+)-gluconic acid δ-lactone was generally 30 mM, and a concentration of the calcium carbonate was generally 25 mM. The gelation was maintained for 12 hours at 25° C.

In step 5, pre-cooling was carried out at a low temperature: the starch/pectin composite hydrogel was frozen at −60° C. to obtain the frozen starch/pectin composite gel system. The gel system was frozen under a metal mold, and a freezing plate should not be directly contacted to achieve uniform ice crystal growth. The freezing process was controlled within 12 hours.

In step 6, freeze drying was carried out: the obtained frozen starch/pectin composite gel was subjected to vacuum freeze drying to remove moisture in the gel system. The freeze drying was carried out under a pressure of 80 Pa for 3 days, and temperatures of a heating plate and a cooling trap were set to be −20° C. and −40° C., respectively. The drying process was controlled to last for 3 days.

In step 7, packaging was carried out: the prepared freeze-dried aerogel was taken out of the mold, and then stored in a dryer.

Figure 2:
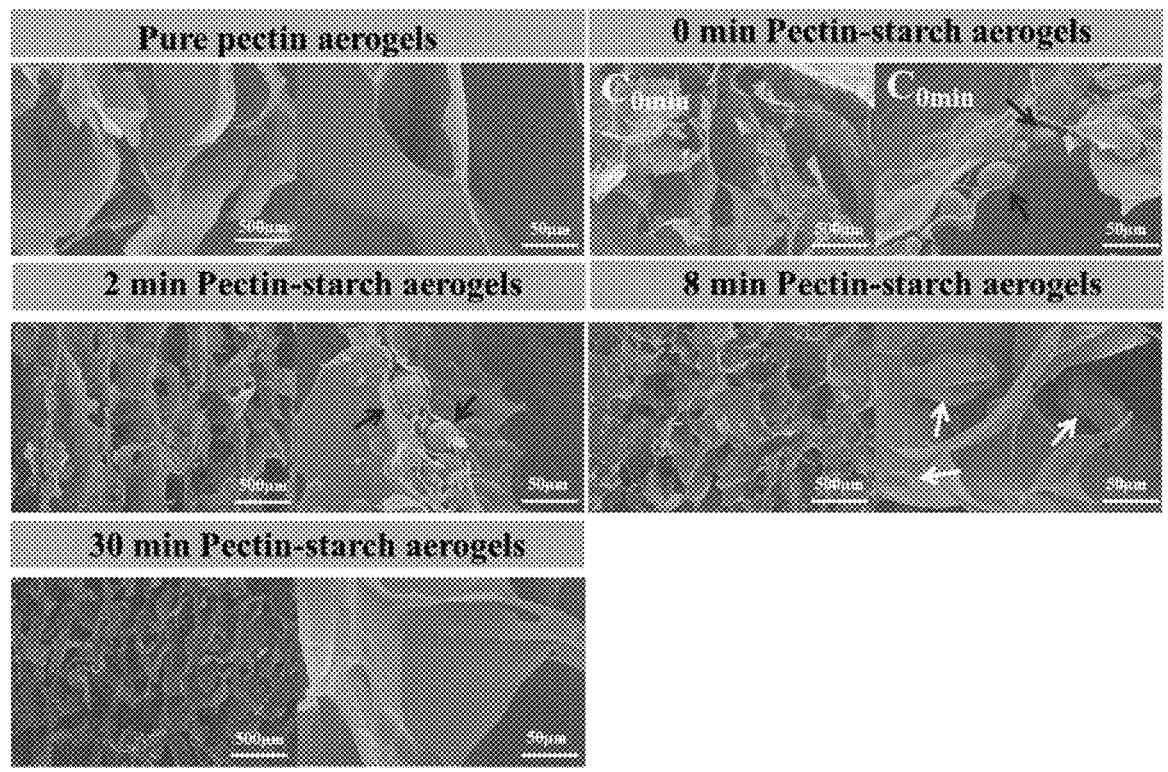
FIG. 2 is an SEM image of freeze-dried pectin/starch aerogels with different degrees of gelatinization.
Figure 3:
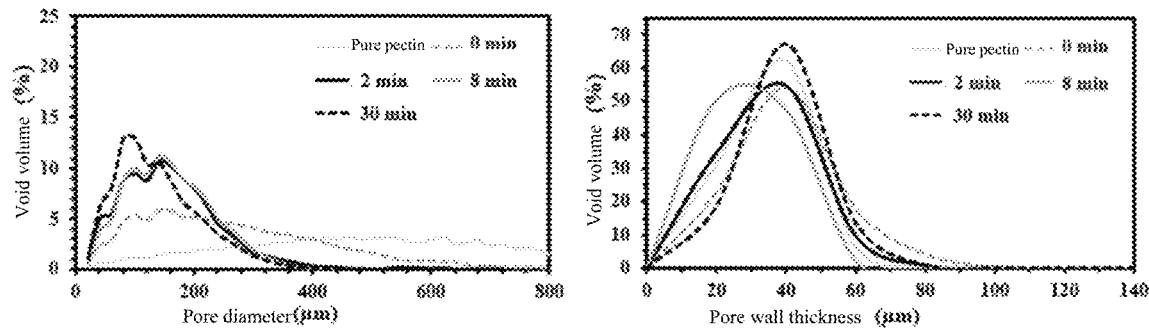
FIG. 3 is an influence table of the starch with different degrees of gelatinization on a pore diameter and a pore wall thickness of the freeze-dried pectin aerogels.

Observation results of freeze-dried pectin aerogels prepared by using the concentration of the low methoxyl pectin being 2.0% (w/v) and different degrees of gelatinization of the starch were as follows:

Measurement method for microstructure:

SEM images of the starch sample and cross-sections of cryogels were captured by a microscope (SU8010, Hitachi Co., Ltd, Tokyo, Japan) at 10 kV accelerated voltage. The fracture cross-section of aerogels was obtained by cutting with a blade. All samples were coated with gold-palladium prior to imaging using an ion sputtering apparatus (MCI000, Hitachi Co., Ltd, Tokyo, Japan).. Results were shown in FIG. 2.

Measurement methods for specific surface area, pore diameter and pore wall thickness To study the microstructural properties of the aerogels, μCT imaging was performed by using a 3D X-ray microscopy (SkyScan 1272, Bruker, USA) with penetrative X-rays of 100 kV and 100 μLA. The pixel size was 10 μm with 700 ms of exposure time in a high-resolution mode. Tomographic reconstructions were performed using filtered back projection and the reconstructed slice stacks were visualized as 3D in the software package NRecon. This software allows the visualization of two-dimensional (2D) cross-sections and provides a complete 3D structure reconstruction without any sample destruction. The sample with a volume of 400 mm$^3$ was defined as a representative reduced volume of interest (VOI). Pore size distribution was identified as the diameter equivalent to the area of the circle. Pore wall thickness was characterized according to the spatial thickness defined as the binarization within the VOI. The specific surface area was calculated according to a sum of two-dimensional areas of all solid objects and a percentage of the solid objects in a total mass of the samples. Results were shown in the table below.

| Sample | Process | Total porosity (%) | Specific surface area (m$^2$/g) |
|---|---|---|---|
| Comparative Example 1 | Pure pectin aerogel | 91.74 | 125.13 |
| Comparative Example 2 | 0 min - pectin/starch aerogel | 86.57 | 129.08 |
| Example 1 | 2 min - pectin/starch aerogel | 81.37 | 158.24 |
| Example 2 | 8 min - pectin/starch aerogel | 84.22 | 143.45 |
| Example 3 | 30 min - pectin/starch aerogel | 84.83 | 228.14 |

Measurement method for hardness and brittleness of material

Figure 4:
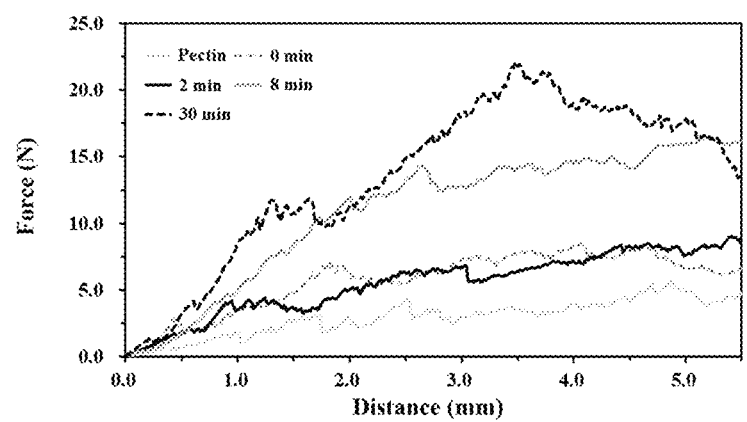
FIG. 4 is an influence table of the starch with different degrees of gelatinization on a mechanical strength of the freeze-dried pectin aerogel.

Mechanical properties of all aerogels were measured through a compression experiment by using a TA-XT2i texture analyzer (Stable Micro Systems, Godalming, UK) equipped with a spherical probe TA/0.5S. The samples were compressed at a constant rate of 1.0 mm/s at a room temperature until maximum 60% strain. The mechanical property of the aerogel was determined by eight repeated force (N)—distance (mm) curves of each sample. The hardness was defined as a maximum magnitude of the force (N), and a number of fracture peaks were used to represent the brittleness. Results were shown in FIG. 4.

A number of modules and a processing scale described herein are used to simplify the description of the present invention. The application, modification and variation of the present invention are obvious to those skilled in the art.

Although the implementations of the present invention have been disclosed above, the implementations are not limited to the applications listed in the specification and the embodiments, and can be fully applied to various fields suitable for the present invention, and additional modifications can be easily implemented by those skilled in the art. Therefore, the present invention is not limited to the specific details and the embodiments shown and described herein without departing from the general concept defined by the claims and the equivalent scope.

The invention claimed is:

1. A method for regulating a porous structure and texture property of a freeze-dried pectin aerogel, comprising the following steps of:
   step 1: preparation of pectin/starch solution by mixing pectin powder and gelatinized starch solutions to form a stable pectin/starch mixed solution, wherein a concentration of the pectin is 0.05% to 0.2% (w/v);
   step 2: induction of gel reaction by adding D-(+)-Glucono-δ-lactone and calcium carbonate into the stable pectin-starch mixed solution; and
   step 3: vacuum freeze-drying of the starch/pectin composite gel subjected to the gel reaction to obtain the freeze-dried pectin/starch aerogel with an adjustable porous structure and an improved texture characteristic.

2. The method for regulating the porous structure and the texture property of the freeze-dried pectin aerogel according to claim 1, wherein in the step 2, in the stable pectin/starch mixed solution, the D-(+)-gluconic acid δ-lactone has a concentration of 30 mM, and the calcium carbonate has a concentration of 25 mM.

3. The method for regulating the porous structure and the texture property of the freeze-dried pectin aerogel according to claim 1, wherein in the step 2, the gel reaction is carried out at a temperature of 25° C. and is maintained for 12 hours.

4. The method for regulating the porous structure and the texture property of the freeze-dried pectin aerogel according to claim 1, wherein in the step 3, the specific method of the vacuum freeze drying comprises: under a vacuum pressure of 80 Pa, setting temperatures of a heating plate and a cooling trap to be −20° C. and −40° C. respectively, and carrying out the vacuum freeze drying for 3 days.

5. The method for regulating the porous structure and the texture property of the freeze-dried pectin aerogel according to claim 1, wherein in the step 3, before carrying out the vacuum freeze drying, the starch/pectin composite gel is frozen at −60° C. for 12 hours to form a starch-pectin composite gel system.

6. The method for regulating the porous structure and the texture property of the freeze-dried pectin aerogel according to claim 1, wherein in the step 1, starch is added into water at a solid-liquid ratio of 1:10, and gelatinized at a constant temperature of 60° C. for 2 minutes to 30 minutes.

7. The method for regulating the porous structure and the texture property of the freeze-dried pectin aerogel according to claim 1, wherein in the step 1, the pectin is low-fat pectin.

8. The method for regulating the porous structure and the texture property of the freeze-dried pectin aerogel according to claim 1, wherein the starch is potato starch.

9. The method for regulating the porous structure and the texture property of the freeze-dried pectin aerogel according to claim 1, wherein in the step 1, the pectin and the gelatinized starch solution are fully stirred by a rotary mixer for 12 hours to obtain the fully hydrated pectin-starch stable mixed sol solution.

\* \* \* \* \*